(12) United States Patent
Fujikawa et al.

(10) Patent No.: US 7,695,854 B2
(45) Date of Patent: Apr. 13, 2010

(54) LITHIUM SECONDARY BATTERY

(75) Inventors: Masato Fujikawa, Osaka (JP); Kaoru Inoue, Osaka (JP); Mikinari Shimada, Osaka (JP)

(73) Assignee: Panasonic Corporation, Osaka (JP)

( * ) Notice: Subject to any disclaimer, the term of this patent is extended or adjusted under 35 U.S.C. 154(b) by 79 days.

(21) Appl. No.: 11/698,094

(22) Filed: Jan. 26, 2007

(65) Prior Publication Data
US 2007/0172736 A1    Jul. 26, 2007

(30) Foreign Application Priority Data
Jan. 26, 2006    (JP) .............................. 2006-017891

(51) Int. Cl.
*H01M 4/64*    (2006.01)
(52) U.S. Cl. ...................... 429/122; 429/233
(58) Field of Classification Search ................ 429/144, 429/254, 251, 252, 231.95, 218.1, 122, 233, 429/211, 246
See application file for complete search history.

(56) References Cited

U.S. PATENT DOCUMENTS

| | | | |
|---|---|---|---|
| 6,537,704 | B1 | 3/2003 | Akashi et al. |
| 6,737,196 | B2 | 5/2004 | Chang et al. |
| 2002/0071989 | A1* | 6/2002 | Verma et al. ................ 429/176 |
| 2006/0141341 | A1* | 6/2006 | Nishino et al. ................ 429/62 |
| 2006/0281006 | A1 | 12/2006 | Fujino et al. |
| 2007/0082261 | A1* | 4/2007 | Lee ............................ 429/144 |

FOREIGN PATENT DOCUMENTS

| | | |
|---|---|---|
| JP | 63-133065 | * 8/1988 |
| JP | 5-121064 | 5/1993 |
| JP | 2005-302634 | 10/2005 |
| KR | 10-2000-0025571 | 5/2001 |
| KR | 20-0244307 | 8/2001 |
| KR | 10-2006-0056287 | 5/2006 |

OTHER PUBLICATIONS

Korean Office Action, with English Translation, issued in Korean Patent Application No. KR 10-2007-0007416 dated on Apr. 29, 2008.
Chinese Office Action issued in Patent Application No. 200710008331X dated on Jun. 27, 2008.

* cited by examiner

*Primary Examiner*—Patrick Ryan
*Assistant Examiner*—Monique Wills
(74) *Attorney, Agent, or Firm*—McDermott Will & Emery LLP (57) ABSTRACT

A lithium secondary battery including: a positive electrode including a strip-shaped positive electrode current collector and a positive electrode active material layer carried on each surface of the positive electrode current collector; a negative electrode including a strip-shaped negative electrode current collector and a negative electrode active material layer carried on each surface of the negative electrode current collector; a separator interposed between the positive electrode and the negative electrode; and a non-aqueous electrolyte, wherein an exposed portion carrying no active material layer is formed on a substantially center portion in a longitudinal direction of a least one of the positive electrode current collector and the negative electrode current collector, a current collecting lead is connected to the exposed portion, and a first heat resistant layer is formed such that the first heat resistant faces at least part of the current collecting lead.

3 Claims, 4 Drawing Sheets

LITHIUM SECONDARY BATTERY

FIELD OF THE INVENTION

The present invention relates to a lithium secondary battery, and more particularly to a lithium secondary battery having both excellent safety and high output power.

BACKGROUND OF THE INVENTION

Lithium secondary batteries, which are light in weight and have a high energy density, are widely used commercially as a power source for portable devices. Currently, lithium secondary batteries are also receiving considerable attention as a possible power source capable of offering high output power for large-scale applications (e.g., a power source for vehicles) and are now under active development.

The electrolytes for use in lithium secondary batteries, however, are usually non-aqueous electrolytes prepared by dissolving a lithium salt in a non-aqueous solvent. Non-aqueous electrolytes have lower ionic conductivity than electrolytes comprising an aqueous solution. Accordingly, it is difficult to achieve lithium secondary batteries having high output power.

Under the circumstances, various techniques to achieve a high output power lithium secondary battery have been proposed. For example, Japanese Laid-Open Utility Model Publication No. Sho 63-133065 and Japanese Laid-Open Patent Publication No. Hei 5-121064 propose a spirally wound design lithium secondary battery (i.e., a lithium secondary battery in which a strip-shaped positive electrode and a strip-shaped negative electrode are spirally wound with a separator interposed therebetween) in which a current collecting lead is connected to a center portion of an electrode. By connecting a current collecting lead to a center portion of an electrode, it is possible to reduce the battery resistance, which results in a lithium secondary battery having increased output power.

In a battery having reduced battery resistance by connecting a current collecting lead to a center portion of an electrode, if an external short circuit occurs, a large short circuit current flows in the battery. The short circuit current concentrates on the current collecting lead, which heats up the current collecting lead. This may cause the adjacent separator to melt. If the separator melts, it causes an internal short circuit, which may lead to overheating of the battery.

BRIEF SUMMARY OF THE INVENTION

An object of the present invention is to achieve both excellent safety and high output power in a lithium secondary battery in which a current collecting lead is connected to a substantially center portion of an electrode by preventing an internal short circuit by forming a heat resistant layer.

Specifically, the present invention relates to a lithium secondary battery comprising: a positive electrode comprising a strip-shaped positive electrode current collector and a positive electrode active material layer carried on each surface of the positive electrode current collector; a negative electrode comprising a strip-shaped negative electrode current collector and a negative electrode active material layer carried on each surface of the negative electrode current collector; a separator interposed between the positive electrode and the negative electrode; and a non-aqueous electrolyte, wherein an exposed portion carrying no active material layer is formed on a substantially center portion in a longitudinal direction of at least one of the positive electrode current collector and the negative electrode current collector, a current collecting lead is connected to the exposed portion, and a first heat resistant layer is formed such that the first heat resistant layer faces at least part of the current collecting lead. The first heat resistant layer is preferably formed such that it faces not less than 50% of the overlapping area of the current collecting lead and the exposed portion.

In the lithium secondary battery of the present invention, a second heat resistant layer is preferably formed such that the second heat resistant layer faces an entire surface of the active material layer that is located across from the current collecting lead. Preferably, the second heat resistant layer is porous. It should be noted, however, that the second heat resistant layer need not be formed in a portion of the active material layer that is located across from the first heat resistant layer. Preferably, the second heat resistant layer faces an almost entire surface (e.g., not less than 80%) of an entire surface of the active material layer that is located across from the current collecting lead.

The first heat resistant layer is preferably thicker than the second heat resistant layer.

The first heat resistant layer preferably has a thickness of 1 to 100 μm.

The second heat resistant layer preferably has a thickness of 1 to 20 μm.

According to the present invention, even when an external short circuit occurs in a lithium secondary battery in which a current collecting lead is connected to a substantially center portion of an electrode, because a heat resistant layer is present, an internal short circuit can be prevented. Accordingly, both excellent safety and high output power can be achieved.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

A lithium secondary battery of the present invention comprises: a positive electrode comprising a strip-shaped positive electrode current collector and a positive electrode active material layer carried on each surface of the positive electrode current collector; and a negative electrode comprising a strip-shaped negative electrode current collector and a negative electrode active material layer carried on each surface of the negative electrode current collector. In short, the positive and negative electrodes both have the shape of a strip. Usually, the positive and negative electrodes are spirally wound with a separator interposed therebetween.

In a substantially center portion in a longitudinal direction of at least one of the positive electrode current collector and the negative electrode current collector, an exposed portion having no active material layer (hereinafter referred to as "center exposed portion") is formed. The center exposed portion may be formed on both surfaces of the current collector, or it may be formed only on one surface of the current collector.

As used herein, the "substantially center portion" refers to an area extending in a longitudinal direction of a current collector excluding both end portions of the current collector. The width of the end portions is, for example, 35% of the length in a longitudinal direction of the current collector. Assuming an area including the mid-center of a current collector in a longitudinal direction and having a certain width W in a longitudinal direction, the substantially center portion can be formed anywhere within the assumed area. The certain width W is, for example, 30% of the length of the longitudinal direction of a current collector. The width of the center exposed portion can vary according to the battery size.

To the center exposed portion is connected a current collecting lead by means of, for example, welding. When the center exposed portion is formed on each surface of a current collector, a current collecting lead is connected to at least one of the center exposed portions. By connecting a current collecting lead to the center exposed portion, the electric resistance of the electrode that is connected to the current collecting lead can be reduced. In order to offer high output power, both center exposed portions may have a current colleting lead connected thereto.

The current collecting lead is, for example, rectangular. Preferably, the current collecting lead has a width smaller than that of the center exposed portion. Specifically, the width of the current collecting lead is 30 to 85% of the width of the center exposed portion. As for the material for the current collecting lead, aluminum is preferred for positive electrode current collecting lead, and nickel or a nickel alloy is preferred for negative electrode current collecting lead.

In the lithium secondary battery of the present invention, a first heat resistant layer is formed such that it faces at least part of the current collecting lead. In the event where an external short circuit and subsequent heating of the current collecting lead occur and the separator melts, the first heat resistant layer serves to prevent an internal short circuit from occurring or expanding.

The thickness of the current collecting lead is not specifically limited. When the center exposed portion is formed only on one surface of a current collector, however, the thickness T of the current collecting lead is preferably smaller than the thickness t of the active material layer of the electrode to which the current collecting lead is connected. Preferably, $0.3t \leq T \leq 0.9t$ is satisfied. The thickness of the first heat resistant layer can be increased by reducing the thickness of the current collecting lead to less than that of the active material layer. This enhances the effect of preventing an internal short circuit by the first heat resistant layer. When T is less than 0.3 t, the current collecting efficiency may be low, or the welding strength may be low.

When the center exposed portion is formed on each surface of a current collector, only one center exposed portion can have a current collecting lead connected thereto. In this case, the thickness T of the current collecting lead is preferably smaller than the total thickness 2 t of the active material layers formed on both surfaces, whereby the effect of preventing an internal short circuit can be enhanced also. Specifically, $0.5t \leq T \leq 1.9t$ is preferably satisfied. When T is less than 0.5 t, the current collecting efficiency may be low, or the welding strength may be low. Further, because a current also tends to concentrate on the other center exposed portion having no current collecting lead connected thereto, another first heat resistant layer is preferably formed such that it faces the other center exposed portion.

When the center exposed portion is formed on each surface of a current collector, both center exposed portions can have a current collecting lead connected thereto. In this case, the thickness T of each current collecting lead is preferably smaller than the thickness t of the active material layer. Preferably, $0.3t \leq T \leq 0.9t$ is satisfied, whereby the effect of preventing an internal short circuit can be enhanced as well.

The first heat resistant layer needs to have higher heat resistance than the separator. The first heat resistant layer preferably includes a resin having a heat deflection temperature of 260° C. or higher (hereinafter referred to as "highly heat resistant resin"). As used herein, the "heat deflection temperature" refers to "a deflection temperature under load" determined with a load of 1.82 MPa according to ASTM-D648 defined by American Society for Testing and Materials.

Alternatively, the first heat resistant layer may include a composite comprising a heat resistant filler (e.g., inorganic oxide or ceramics) and a resin binder. The heat deflection temperature of the resin binder is not specifically limited. Alternatively, a tape made of a material having higher heat resistance than the separator may be used as a first heat resistant layer.

The first heat resistant layer may be porous or nonporous. It is preferable that the shape of the first heat resistant layer be identical to that of the center exposed portion, or the first heat resistant layer completely cover the center exposed portion. In other words, the first heat resistant layer is preferably formed such that it faces not only the current collecting lead but also the entire center exposed portion.

In an embodiment of the lithium secondary battery of the present invention, a second heat resistant layer can be formed such that it faces an almost entire surface of the active material layer that is located across from the current collecting lead. The second heat resistant layer should be porous so as not to prevent the migration of ions. Preferably, the second heat resistant layer has a porosity (a ratio of the volume of the pores to the apparent volume of the second heat resistant layer) of 20 to 70%. The porosity can be calculated from the true specific gravity, weight and thickness of a specified area of the second heat resistant layer.

The second heat resistant layer may have the same composition as the first heat resistant layer, or it may have a composition different from that of the first heat resistant layer. In other words, a porous heat resistant layer may be formed such that it faces an entire surface of the active material layer that is located across from the current collecting lead. In this case, the first heat resistant layer and the second heat resistant layer which are porous may be formed in the same process. By placing the first and second heat resistant layers such that they cooperatively face an almost entire surface of the active material layer that is located across from the current collecting lead, it is possible to significantly enhance safety upon occurrence of an internal short circuit as well as an external short circuit. More specifically, even when a large current flows through an internal short circuit point, causing heat generation to melt the separator, it is possible to prevent the short circuit from expanding.

The first heat resistant layer is preferably thicker than the second heat resistant layer. The thickness of the first heat resistant layer is preferably 130 to 500% of the thickness of the second heat resistant layer. This further enhances the heat resistance of the center exposed portion where heat tends to concentrate in external short circuit conditions. On the other hand, when the thickness of the second heat resistant layer that faces an almost entire surface of the active material is reduced, the migration of ions between electrode plates is not inhibited, and therefore high output power can be obtained.

The first heat resistant layer preferably has a thickness of 1 to 100 µm, and more preferably 3 to 30 µm. When the first heat resistant layer has a thickness of less than 1 µm, the effect of enhancing safety in external short circuit conditions becomes small. Conversely, when the first heat resistant layer has a thickness exceeding 100 µm, the thickness of the first heat resistant layer may become too large relative to the thickness of the active material layer of the electrode having the current collecting lead. This increases the resistance of the battery, which may fail to provide high output power.

The second heat resistant layer preferably has a thickness of 1 to 20 µm, and more preferably 2 to 15 µm. When the second heat resistant layer has a thickness of less than 1 µm, the effect of enhancing safety in the event of an internal short circuit becomes small. Conversely, when the second heat resistant layer has a thickness exceeding 20 µm, the resistance of the battery increases, which may fail to provide high output power.

The thicknesses of the first and second heat resistant layers can be controlled by changing the conditions for applying a precursor for each heat resistant layer onto a substrate (e.g., a positive electrode, negative electrode or separator). When a precursor for heat resistant layer is applied onto a substrate by a die coater, for example, the thickness of the resulting heat resistant layer can be increased by decreasing the moving speed of the substrate. When a precursor for heat resistant layer is applied onto a substrate by a gravure roll, the thickness of the resulting heat resistant layer can be increased by increasing the rotation speed of the gravure roll. Further, the thickness of the first heat resistant layer may be increased relative to that of the second heat resistant layer by repeatedly applying a precursor for heat resistant layer to the specific area corresponding to the location of the first heat resistant layer.

The heat resistant layers swell due to permeation of non-aqueous electrolyte. Moreover, as for the second heat resistant layer that faces an almost entire surface of the active material layer, pressure is easily applied thereto when spirally wound. Accordingly, by increasing the amount of non-aqueous electrolyte, the thickness of the first heat resistant layer to which pressure is not easily applied can be made substantially thick.

The heat resistant layer(s) can be formed anywhere between the positive and negative electrodes. For example, the heat resistant layer(s) can be formed on the positive electrode or on the negative electrode, or the heat resistant layer(s) can be combined with the separator. Alternatively, a separate sheet (a separate film) comprising a heat resistant layer(s) prepared by applying a precursor for heat resistant layer onto a flat substrate and removing the formed heat resistant layer from the substrate can be used.

The porous heat resistant layers are preferably made of a highly heat resistant resin or a composite comprising a heat resistant filler and a resin binder. The heat resistant layer comprising a highly heat resistant resin can contain, for example, less than 80 wt % (preferably, 25 to 75 wt %) of an insulating filler. The inclusion of an insulating filler provides a heat resistant layer having excellent balance of flexibility and durability. The heat resistant layer comprising a composite comprising a heat resistant filler and a resin binder, on the other hand, is composed mainly of a heat resistant filler. The amount of the heat resistant filler is, for example, 80 wt % or greater of the heat resistant layer.

Examples of the highly heat resistant resin include aramid (aromatic polyamide), polyamide imide, polyimide and cellulose. They may be used singly or in any combination of two or more.

Examples of the heat resistant filler and insulating filler include inorganic oxide, ceramics, glass, fibrous highly heat resistant resin and particulate highly heat resistant resin. Examples of the inorganic oxide include alumina, silica, titania, zirconia, magnesia and yttria. They are preferred because they are chemically stable in a battery. They may be used singly or in any combination of two or more.

As the resin binder, an acrylic rubber particle such as BM-500B (trade name) available from Zeon Corporation, Japan, polytetrafluoroethylene (PTFE) or polyvinylidene fluoride (PVDF) can be used. PTFE and the rubber particle are preferably used together with a thickener. As the thickener, carboxymethyl cellulose (CMC), polyethylene oxide (PEO), modified polyacrylonitrile rubber (e.g., BM-720H (trade name) available from Zeon Corporation, Japan).

The porous heat resistant layer comprising a highly heat resistant resin can be obtained by any of the following methods, for example.

(i) A resin solution is first prepared by dissolving a highly heat resistant resin in a solvent. The solvent for dissolving the highly heat resistant resin is not specifically limited, but preferred is a polar solvent such as N-methyl-2-pyrrolidone (NMP). In the resin solution, an insulating filler may be dispersed in an amount of 500 parts by weight or less (preferably 33 to 300 parts by weight) per 100 parts by weight of the highly heat resistant resin. The resin solution may further contain a pore-forming agent such as calcium chloride. The thus-prepared resin solution is applied onto a surface of at least one of the positive electrode, negative electrode and separator, which is then dried or washed to remove the solvent and the pore-forming agent. In this manner, a porous heat resistant layer combined with the positive electrode, negative electrode or separator can be obtained.

(ii) The same resin solution as prepared above (i) is applied onto a flat substrate (e.g., made of glass or stainless steel), which is then dried or washed to remove the solvent and the pore-forming agent. The resulting porous sheet comprising a highly heat resistant resin is peeled off from the substrate to obtain a separate film. The separate film is placed between electrodes or between an electrode and a separator.

The heat resistant layer comprising a composite comprising a heat resistant filler and a resin binder can be obtained by any of the following methods, for example.

(iii) A paste or slurry is first prepared by mixing a heat resistant filler and a resin binder with a liquid component. Preferred amount of the resin binder is 0.5 to 10 parts by weight per 100 parts by weight of the heat resistant filler. The liquid component is not specifically limited. For example, NMP can be used. The heat resistant filler, the resin binder and the liquid component can be mixed using, for example, a double arm kneader. The obtained paste or slurry is applied onto a surface of at least one of the positive electrode, negative electrode and separator, which is then dried to remove the liquid component. The paste or slurry can be applied using, for example, a doctor blade, die coater or gravure roll.

(iv) The same paste or slurry as prepared above (iii) is applied onto a flat substrate, which is then dried to remove the liquid component. The resulting porous sheet made of a composite comprising a heat resistant filler and a resin binder is peeled off from the substrate to obtain a separate film. The separate film is placed between electrodes or between an electrode and a separator.

The positive electrode current collector is preferably an aluminum foil or an aluminum alloy foil. The thickness is preferably 10 to 30 µm. The positive electrode active material can be any material conventionally used as a positive electrode active material for lithium secondary batteries. Specifically, a lithium-containing transition metal oxide such as lithium cobalt oxide, lithium nickel oxide or lithium manganese oxide can be used. Part of the transition metal contained in the lithium-containing transition metal oxide may be replaced with other element. The surface of the oxide particle may be covered with other element. The materials for positive electrode active material may be used singly or in any combination of two or more.

The positive electrode active material layer is preferably prepared by allowing a current collector to carry a material mixture comprising a positive electrode active material and a small amount of a binder (e.g., PTFE, PVDF, BM-500B, etc.). The positive electrode material mixture may further contain a small amount of a conductive material (e.g., acetylene black, ketjen black, graphite, etc.).

The negative electrode current collector is preferably a copper foil. The thickness is preferably 5 to 50 µm. The negative electrode active material can be any material conventionally used as a negative electrode active material for lithium secondary batteries. Examples include a carbon material (e.g., natural graphite, artificial graphite, hard carbon), an element capable of alloying with lithium (e.g., Al, Si, Zn, Ge, Cd, Sn, Ti, Pb), a silicon compound (e.g., $SiO_x(0<x<2)$), a tin compound (e.g., SnO), lithium metal and an alloy (e.g., Ni—Si alloy, Ti—Si alloy). The lithium metal can be simple substance of lithium or a lithium alloy such as Li—Al alloy. The materials for negative electrode active material may be used singly or in any combination of two or more.

The negative electrode active material may be deposited directly onto the current collector. Preferably, the negative electrode active material layer is prepared by allowing a current collector to carry a material mixture comprising a negative electrode active material and a small amount of a binder (e.g., PVDF, styrene butadiene rubber, polyacrylic acid). Similar to the positive electrode, the negative electrode material mixture may further contain a conductive material.

When the current collector of one electrode has a center exposed portion having a current collecting lead connected thereto, there is no specific limitation on the current collector of the other electrode in terms of the position of the exposed portion to which a current collecting lead is connected, the shape of the exposed portion, the area of the exposed portion, etc.

The separator can be made of any material conventionally used for separators for lithium secondary batteries. Preferably used is a microporous film made of a polyolefin resin such as polyethylene or polypropylene. Particularly preferred is a monolayer film made of polyethylene or a multilayer film comprising a polyethylene layer and a polypropylene layer.

As for the non-aqueous electrolyte and the battery case, any conventional non-aqueous electrolyte and battery case for lithium secondary batteries can be used. Also, any conventional known technique for lithium secondary batteries may be applied to the lithium secondary battery of the present invention. The non-aqueous electrolyte preferably comprises a non-aqueous solvent and a lithium salt as a solute dissolved in the non-aqueous solvent.

Examples of the lithium salt include lithium hexafluorophosphate ($LiPF_6$), lithium perchlorate ($LiClO_4$), lithium tetrafluoroborate ($LiBF_4$), $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, LiCl, LiBr, LiI, lithium tetrachloroborate, lithium tetraphenylborate and lithium imide salt. They may be used singly or in any combination of two or more. Preferred amount of the lithium salt dissolved in the non-aqueous solvent is not specifically limited. Preferred lithium salt concentration is 0.2 to 2 mol/L, and more preferably 0.5 to 1.5 mol/L.

Examples of the non-aqueous solvent include: cyclic carbonates such as ethylene carbonate (EC), propylene carbonate (PC) and butylene carbonate (BC); chain carbonates such as dimethyl carbonate (DMC), diethyl carbonate(DEC), ethyl methyl carbonate (EMC) and dipropyl carbonate(DPC); aliphatic carboxylic acid esters such as methyl formate, methyl acetate, methyl propionate and ethyl propionate; lactones such as γ-butyrolactone and γ-valerolactone; chain ethers such as 1,2-dimethoxyethane (DME), 1,2-diethoxyethane (DEE) and ethoxymethoxyethane (EME); cyclic ethers such as tetrahydrofuran and 2-methyltetrahydrofuran; dimethyl sulfoxide; 1,3-dioxolane; formamide; acetamide; dimethylformamide; dioxolane; acetonitrile; propionitrile; nitromethane; ethyl monoglyme; phosphoric acid triester; trimethoxymethane; dioxolane derivative; sulfolane; methylsulfolane; 1,3-dimethyl-2-imidazolidinone; 3-methyl-2-oxazolidinone; propylene carbonate derivative; tetrahydrofuran derivative; ethyl ether; 1,3-propanesultone; anisole; dimethyl sulfoxide; and N-methyl-2-pyrrolidone. They may be used singly, but combined use of two or more is preferred. Particularly preferred is a mixed solvent of a cyclic carbonate and a chain carbonate or a mixed solvent of a cyclic carbonate, a chain carbonate and an aliphatic carboxylic acid ester.

The non-aqueous electrolyte may further contain an additive so as to improve charge/discharge characteristics of the battery. The additive is preferably vinylene carbonate (VC), vinyl ethylene carbonate (VEC), cyclohexylbenzene (CHB), fluorobenzene, etc. These additives serve to form a coating film on the positive and/or negative electrodes, which improves the stability during overcharge.

The battery case should be electrochemically stable in a normal operating voltage of lithium secondary batteries. Preferred is a battery case made of iron or the like. The battery case may be plated with nickel or tin.

An electrode group is inserted into the battery case, after which the non-aqueous electrolyte is injected thereinto. The opening of the battery case is then sealed with a lid with the edge of the opening crimping onto the periphery of the lid to produce a lithium secondary battery.

The present invention will be described below in further detail with reference to examples, but it should be understood that the present invention is not limited to the examples given below. Examples of the present invention will be described with reference to FIGS. 1 to 7 schematically showing electrode configurations.

EXAMPLE 1

(i) Production of Positive Electrode

Figure 1:
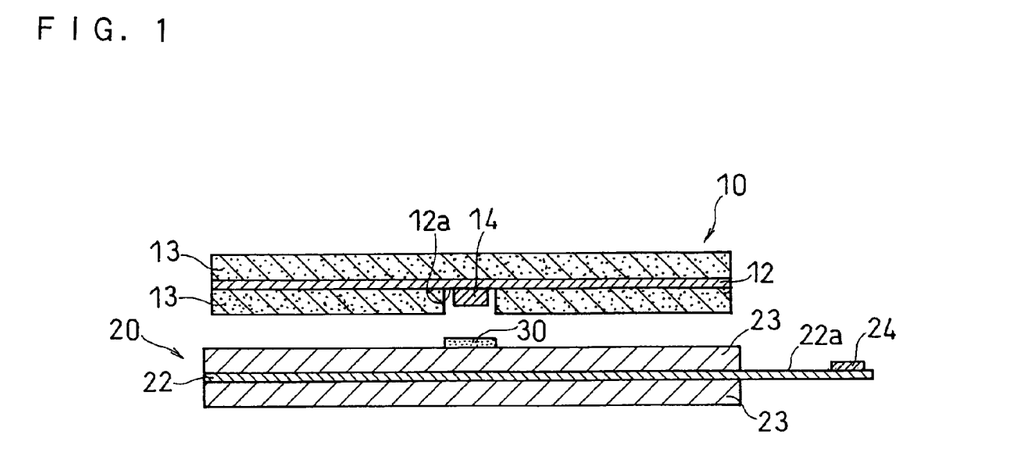
FIG. 1 is a schematic diagram illustrating a configuration of the positive electrode and the negative electrode of a lithium secondary battery according to EXAMPLE 1.

A positive electrode material mixture paste was prepared by mixing 3 kg of lithium cobalt oxide with 1 kg of PVDF#1320 (an N-methyl-2-pyrrolidone (NMP) solution containing 12 wt % PVDF) available from Kureha Chemical Industry Co., Ltd., 90 g of acetylene black and an appropriate amount of NMP with the use of a double arm kneader. This paste was applied onto each entire surface of a 15 μm thick aluminum foil serving as a positive electrode current collector 12 except for a center exposed portion 12a, which was then dried and rolled to form positive electrode active material layers 13, each having an active material density of 3.5 g/cm$^3$ and a thickness of 80 μm. The positive electrode current collector 12 was cut into a strip having a size of 600 mm×56 mm. Thereby, a positive electrode 10 was obtained. The center exposed portion 12a having a width of 15 mm was positioned exactly at the center in a longitudinal direction of the positive electrode current collector 12. To the center of the center exposed portion 12a was welded a positive electrode current collecting lead 14 having a width of 7 mm and a thickness of 60 μm.

(ii) Production of Negative Electrode

A negative electrode material mixture paste was prepared by mixing 3 kg of artificial graphite, 75 g of BM-400B (an aqueous dispersion containing 40 wt % styrene-butadiene copolymer rubber particles) available from Zeon Corporation, Japan, 30 g of carboxymethyl cellulose (CMC) and an appropriate amount of water with the use of a double arm kneader. This paste was applied onto each entire surface of a 10 μm thick copper foil serving as a negative electrode current collector 22 except for one end of the negative electrode current collector 22 serving as an end exposed portion 22a, which was then dried and rolled to form negative electrode active material layers 23, each having an active material density of 1.6 g/cm$^3$ and a thickness of 85 μm. The negative electrode current collector 22 was cut into a strip having a size of 650 mm×57.5 mm. Thereby, a negative electrode 20 was obtained. The end exposed portion 22a formed at one end of the negative electrode current collector 22 had a width of 70 mm. Both surfaces of the end exposed portion 22a carried no negative electrode active material. A negative electrode current collecting lead 24 having a width of 3 mm and a thickness of 100 μm was welded onto one surface of the end exposed portion 22a at about endmost portion thereof.

(iii) Formation of Heat Resistant Layer

As shown in FIG. 1, a first heat resistant layer 30 having a thickness of 5 μm and a width of 15 mm was formed on the negative electrode active material layer 23 such that it faced the center exposed portion 12a of the positive electrode 10. The heat resistant layer 30 was formed as follows. A precursor paste was first prepared by mixing 970 g of alumina having a median size of 0.3 μm with 375 g of BM-720H (trade name, an NMP solution containing 8 wt % modified polyacrylonitrile rubber) available from Zeon Corporation, Japan and an appropriate amount of NMP with the use of a double arm kneader. This paste was applied onto a specified portion of the negative electrode active material layer 23 by a gravure roll, which was then dried at 120° C. in a vacuum with a reduced pressure for 10 hours. Thereby, the first heat resistant layer 30 was formed.

(iv) Assembly of Battery

The positive electrode 10 and the negative electrode 20 having the heat resistant layer 30 were placed with a 20 μm thick separator made of a polyethylene microporous film (available from Celgard Inc., width: 60.7 mm) interposed therebetween such that the center exposed portion 12a of the positive electrode 10 and the heat resistant layer 30 faced each other. The resultant was then spirally wound to form an electrode group. The negative electrode current collecting lead 24 was positioned at the winding-end side (i.e., at the outermost portion of the electrode group when spirally wound). This electrode group was housed into a cylindrical iron battery case plated with nickel (diameter: 18 mm, height: 65 mm, inner diameter: 17.85 mm). Thereafter, 5.5 g of a non-aqueous electrolyte was injected into the battery case. The opening of the battery case was then sealed with a lid. Thereby, a cylindrical lithium secondary battery having a design capacity of 2000 mAh was produced.

The non-aqueous electrolyte used here was prepared by dissolving $LiPF_6$ in a solvent mixture of ethylene carbonate (EC), dimethyl carbonate (DMC) and ethyl methyl carbonate (EMC) at a volume ratio of 1:1:1 at a $LiPF_6$ concentration of 1 mol/L. The non-aqueous electrolyte further contained 3 wt % of vinylene carbonate (VC).

Comparative Example 1

A lithium secondary battery was produced in the same manner as in EXAMPLE 1 except that the first heat resistant layer was not formed on the negative electrode active material layer 23.

EXAMPLE 2

Figure 2:
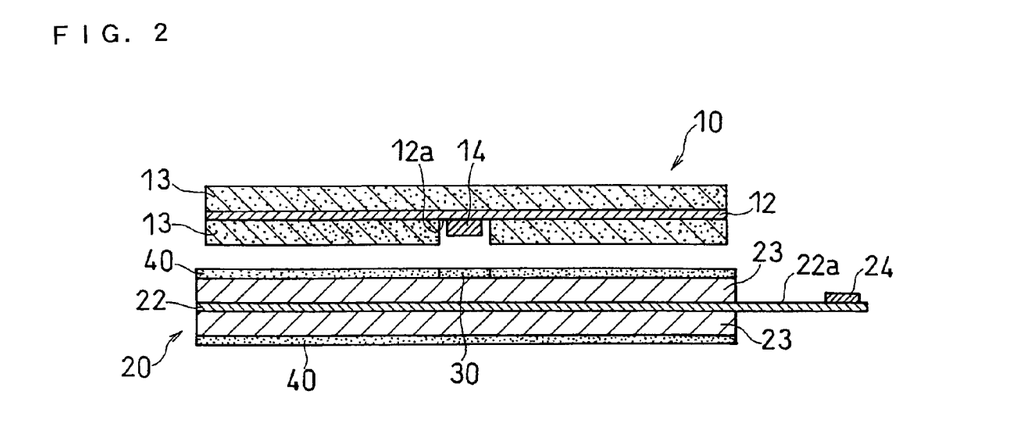
FIG. 2 is a schematic diagram illustrating a configuration of the positive electrode and the negative electrode of a lithium secondary battery according to EXAMPLE 2.

As shown in FIG. 2, a lithium secondary battery was produced in the same manner as in EXAMPLE 1 except that a second heat resistant layer 40 was further formed using the same precursor paste as used for the first heat resistant layer in EXAMPLE 1. Specifically, in this example, in addition to the first heat resistant layer 30, a second heat resistant layer having a thickness of 5 μm was formed on the negative electrode active material layer 23 such that the second heat resistant layer faced the almost entire surface of the positive electrode active material layer 13. Similar to the first heat resistant layer 30, the second heat resistant layer 40 was formed by applying the precursor paste onto the negative electrode active material layer by a gravure roll.

EXAMPLE 3

A lithium secondary battery was produced in the same manner as in EXAMPLE 1 except that the first heat resistant layer was directly formed on the positive electrode 10 such that the first heat resistant layer covered the center exposed portion 12a having the positive electrode current collecting lead 14 connected thereto.

EXAMPLE 4

A lithium secondary battery was produced in the same manner as in EXAMPLE 1 except that the first heat resistant layer was directly formed on the positive electrode 10 such that the first heat resistant layer covered the center exposed portion 12a having the positive electrode current collecting lead 14 connected thereto, and that the second heat resistant layer was also formed, using the same precursor paste, directly on the positive electrode 10 such that the second heat resistant layer covered the entire surface of the positive electrode active material layer 13.

EXAMPLE 5

A lithium secondary battery was produced in the same manner as in EXAMPLE 1 except that the first heat resistant layer was formed on the separator such that the first heat resistant layer faced the center exposed portion 12a.

EXAMPLE 6

A lithium secondary battery was produced in the same manner as in EXAMPLE 1 except that the first heat resistant layer was formed on the separator such that the first heat resistant layer faced the center exposed portion 12a, and that the second heat resistant layer was formed, using the same precursor paste, on the surface of the separator such that the second heat resistant layer faced the entire surface of the positive electrode active material layer 13.

EXAMPLES 7 TO 9

Lithium secondary batteries were produced in the same manner as in EXAMPLE 2 except that the heat resistant layers were formed using a precursor paste prepared by replacing alumina with magnesia, zirconia or silica having a median size of 0.3 µm.

EXAMPLES 10 TO 12

Lithium secondary batteries were produced in the same manner as in EXAMPLE 2 except that the heat resistant layers were formed using a precursor paste prepared by replacing alumina with aramid particles, polyamide imide particles or polyimide particles having a median size of 0.3 µm.

EXAMPLES 13 TO 15

Lithium secondary batteries were produced in the same manner as in EXAMPLE 6 except that the heat resistant layers were formed using a precursor paste prepared by replacing alumina with magnesia, zirconia or silica having a median size of 0.3 µm.

EXAMPLE 16

Dried anhydrous calcium chloride in an amount of 65 g was dissolved completely in 1 kg of NMP in a reaction vessel heated to 80° C. The resulting NMP solution of calcium chloride was cooled to room temperature, after which 32 g of paraphenylenediamine was dissolved completely in the NMP solution. Subsequently, the reaction vessel was placed in a thermostatic chamber set at 20° C., and 58 g of dichloroterephthalate was added dropwise to the NMP solution over one hour. The NMP solution was then allowed to stand in the thermostatic chamber set at 20° C. for one hour to allow a polymerization reaction to proceed to synthesize polyparaphenylene terephthalamide (hereinafter simply referred to as "PPTA"). After the completion of the reaction, the NMP solution (polymerized solution) was transferred from the thermostatic chamber to a vacuum chamber having reduced pressure where the NMP solution was stirred for 30 minutes to degas it. The resulting polymerized solution was diluted with another NMP solution of calcium chloride to prepare an NMP solution of aramid resin having a PPTA concentration of 1.4 wt %.

The obtained NMP solution of aramid resin was applied onto one entire surface of the separator by a bar coater to form a coating film of aramid resin such that the coating film faced the center exposed portion 12a and the entire positive electrode active material layer 13 of the positive electrode 10, which was then dried with hot air (80° C.) blown at a velocity of 0.5 m/sec. The formed coating film of aramid resin was thoroughly washed with pure water to remove calcium chloride, and then dried again. Thereby, a 5 µM thick heat resistant layer made of aramid resin was formed on one entire surface of the separator. The heat deflection temperature (deflection temperature under load) of the aramid resin was measured according to ASTM and found to be 321° C. A lithium secondary battery was produced in the same manner as in COMPARATIVE EXAMPLE 1 except that the thus-obtained separator having a heat resistant layer of aramid resin was used.

EXAMPLE 17

An NMP solution of polyamide acid (polyamide acid concentration: 3.9 wt %) was prepared by mixing 21 g of trimellitic anhydride monochloride and 20 g of diamine (diamino diphenyl ether) with 1 kg of NMP at room temperature. The resulting NMP solution of polyamide acid was applied onto one entire surface of the separator by a bar coater, which was then dried with hot air (80° C.) blown at a velocity of 0.5 m/sec and, at the same time, the polyamide acid was cyclodehydrated to produce polyamide imide. Thereby, a 5 µm thick heat resistant layer of polyamide imide resin was formed on one entire surface of the separator. Accordingly, the heat resistant layer of polyamide imide resin faced the center exposed portion 12a and the entire positive electrode active material layer 13 of the positive electrode 10. The heat deflection temperature (deflection temperature under load) of the polyamide imide resin was measured according to ASTM and found to be 280° C. A lithium secondary battery was produced in the same manner as in COMPARATIVE EXAMPLE 1 except that the thus-obtained separator having a heat resistant layer of polyamide imide resin was used.

EXAMPLE 18

An NMP solution of polyamide acid (polyamide acid concentration: 3.9 wt %) was prepared by mixing 21 g of pyromellitic dianhydride and 20 g of diamine (diamino diphenyl ether) with 1 kg of NMP at room temperature. The obtained NMP solution of polyamide acid was applied onto a SUS substrate by a bar coater, which was then dried with hot air (80° C.) blown at a velocity of 0.5 m/sec. The formed coating film was peeled off from the substrate, after which the peeled film was drawn to form a heat resistant layer comprising a polyimide precursor.

The heat resistant layer of a polyimide precursor was heated at 300° C. to imidize the precursor by dehydration to form a 5 µm thick heat resistant layer comprising polyimide resin. This heat resistant layer of polyimide resin and a separator were rolled by rollers heated at 80° C. to combine them together. Thereby, a separator having 5 µm thick heat resistant layer of polyimide resin formed on one entire surface of the separator was obtained. The heat resistant layer of polyimide resin faced the center exposed portion 12a and the entire positive electrode active material layer 13 of the positive electrode 10. The heat deflection temperature of the polyimide resin was 362° C. A lithium secondary battery was produced in the same manner as in COMPARATIVE EXAMPLE 1 except that the thus-obtained separator having a heat resistant layer of polyimide resin was used.

EXAMPLES 19 TO 21

Lithium secondary batteries were produced in the same manner as in EXAMPLE 2 except that the thickness of the first heat resistant layer was changed to 7 µm, 10 µm or 30 µm.

EXAMPLES 22 TO 26

Lithium secondary batteries were produced in the same manner as in EXAMPLE 1 except that the thickness of the first heat resistant layer was changed to 0.5 μm, 1 μm, 30 μm, 100 μm or 150 μm.

EXAMPLES 27 TO 30

Lithium secondary batteries were produced in the same manner as in EXAMPLE 2 except that the thicknesses of the first and second heat resistant layers were changed to 0.5 μm, 1 μm, 20 μm or 25 μm.

Comparative Example 2

A positive electrode was produced in the same manner as in EXAMPLE 1 except that, instead of forming the center exposed portion 12a on the positive electrode current collector 12, similar to the negative electrode 20, an end exposed portion 12c was formed at one end of the positive electrode current collector 12. The positive electrode current collecting lead 14 was welded to one surface of the end exposed portion 12c at about endmost portion of the positive electrode current collector 12. Subsequently, a lithium secondary battery was produced in the same manner as in EXAMPLE 2 except that the first heat resistant layer was formed on the negative electrode active material layer such that the first heat resistant layer faced the end exposed portion 12c of the positive electrode, and that the positive electrode current collecting lead 14 was positioned at the winding-start side of the electrode group (i.e., at the innermost portion of the electrode group when spirally wound).

EXAMPLE 31

Figure 3:
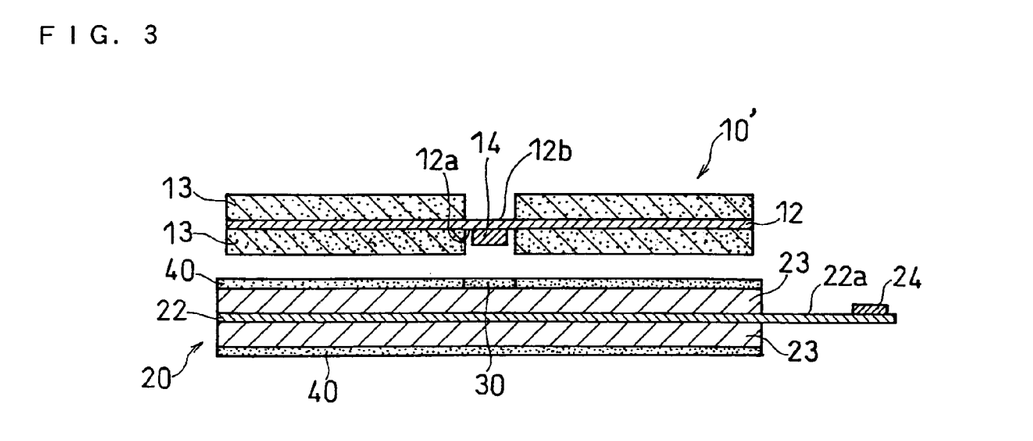
FIG. 3 is a schematic diagram illustrating a configuration of the positive electrode and the negative electrode of a lithium secondary battery according to EXAMPLE 31.

A lithium secondary battery was produced in the same manner as in EXAMPLE 2 except that, as shown in positive electrode 10' of FIG. 3, in addition to the center exposed portion 12a, another center exposed portion 12b was formed on the other surface of the positive electrode current collector 12, and that the first heat resistant layer was further formed such that it faced the center exposed portion 12b having no current collecting lead connected thereto was formed.

EXAMPLE 32

Figure 4:
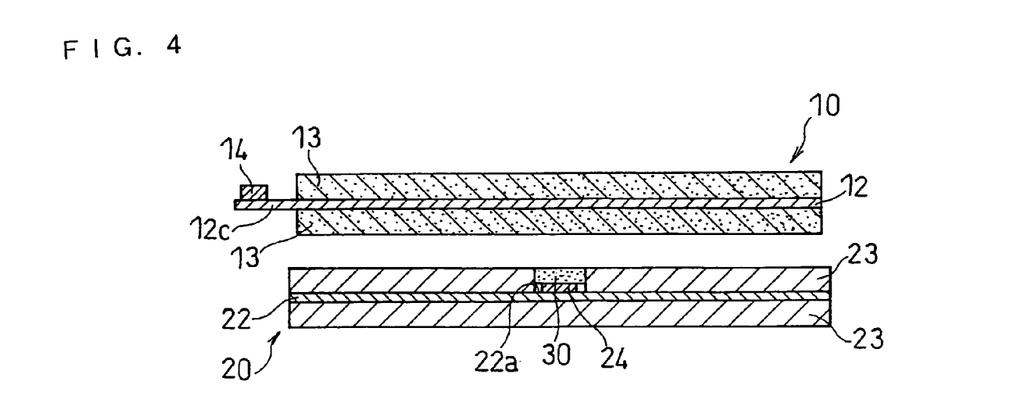
FIG. 4 is a schematic diagram illustrating a configuration of the positive electrode and the negative electrode of a lithium secondary battery according to EXAMPLE 32.

As shown in FIG. 4, a center exposed portion 22a having a width of 12 mm was formed on the negative electrode 20. The center exposed portion 22a was positioned exactly at the center in a longitudinal direction of the negative electrode current collector 22. To the center of the center exposed portion 22a was welded a negative electrode current collecting lead 24 having a width of 6 mm and a thickness of 50 μm.

Using the precursor paste prepared in EXAMPLE 1, a 5 μm thick first heat resistant layer 30 was directly formed on the negative electrode 20 such that the first heat resistant layer covered the center exposed portion 22a having the negative electrode current collecting lead 24 connected thereto. A lithium secondary battery was produced in the same manner as in EXAMPLE 1 except that the above negative electrode and the same positive electrode as COMPARATIVE EXAMPLE 2 were used, and that the positive electrode current collecting lead was positioned at the winding-start side of the electrode group.

EXAMPLE 33

Figure 5:
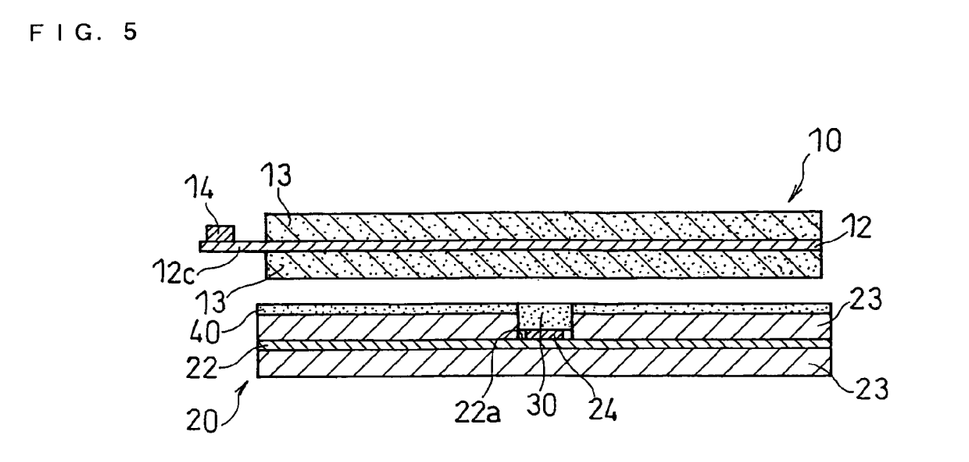
FIG. 5 is a schematic diagram illustrating a configuration of the positive electrode and the negative electrode of a lithium secondary battery according to EXAMPLE 33.

A lithium secondary battery was produced in the same manner as in EXAMPLE 32 except that a second heat resistant layer 40 was further formed as shown in FIG. 5 using the precursor paste prepared in EXAMPLE 1. In other words, in this example, in addition to the first heat resistant layer 30, a second heat resistant layer having a thickness of 5 μm was formed on the negative electrode active material layer 23 such that the second heat resistant layer 40 faced the entire surface of the positive electrode active material layer 13.

EXAMPLE 34

A lithium secondary battery was produced in the same manner as in EXAMPLE 32 except that the first heat resistant layer 30 was formed on the positive electrode 10 such that the first heat resistant layer faced the center exposed portion 22a having the negative electrode current collecting lead 24 connected thereto.

EXAMPLE 35

A lithium secondary battery was produced in the same manner as in EXAMPLE 32 except that the first heat resistant layer 30 was formed on the positive electrode 10 such that the first heat resistant layer faced the center exposed portion 22a having the negative electrode current collecting lead 24 connected thereto, and that a second heat resistant layer 40 was formed, using the same precursor paste, on the positive electrode 10 such that the second heat resistant layer covered the entire surface of the positive electrode active material layer 13.

EXAMPLE 36

A lithium secondary battery was produced in the same manner as in EXAMPLE 32 except that the first heat resistant layer 30 was formed on the separator such that the first heat resistant layer faced the center exposed portion 22a.

EXAMPLE 37

A lithium secondary battery was produced in the same manner as in EXAMPLE 32 except that the first heat resistant layer 30 was formed on the separator such that the first heat resistant layer faced the center exposed portion 22a, and that a second heat resistant layer 40 was formed, using the same precursor paste, on one surface of the separator such that the second heat resistant layer faced the entire surface of the positive electrode active material layer 13.

EXAMPLE 38

Figure 6:
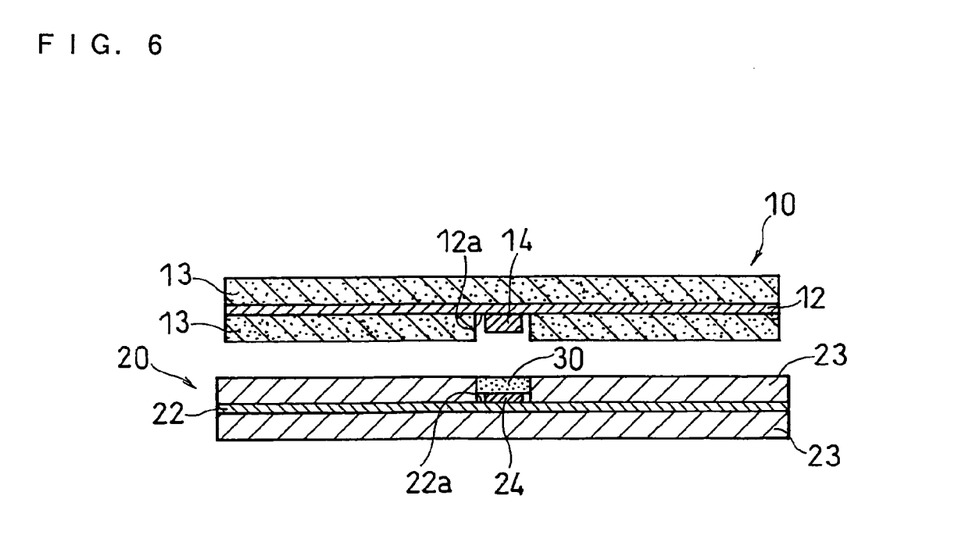
FIG. 6 is a schematic diagram illustrating a configuration of the positive electrode and the negative electrode of a lithium secondary battery according to EXAMPLE 38.

A lithium secondary battery was produced in the same manner as in EXAMPLE 32 except that the same positive electrode 10 as EXAMPLE 1 and the same negative electrode 20 as EXAMPLE 32 were used, and that the positive and negative electrodes were placed such that the center exposed portions of the positive and negative electrodes faced each other as shown in FIG. 6.

EXAMPLE 39

Figure 7:
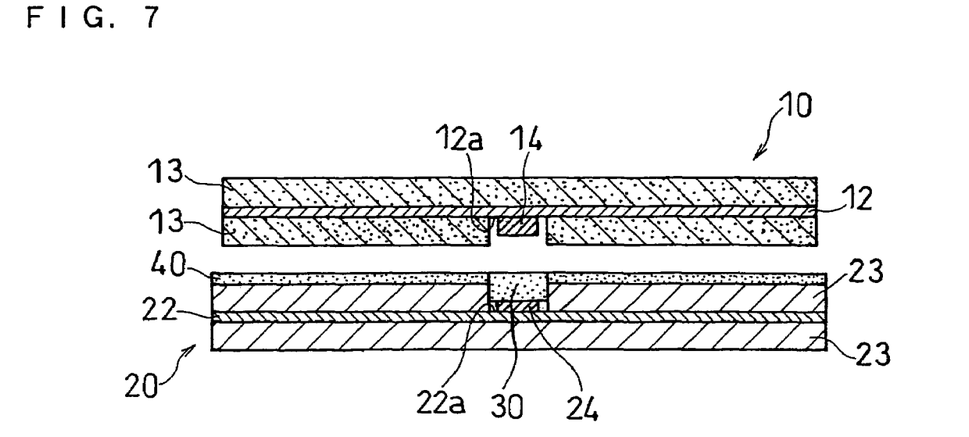
FIG. 7 is a schematic diagram illustrating a configuration of the positive electrode and the negative electrode of a lithium secondary battery according to EXAMPLE 39.

A lithium secondary battery was produced in the same manner as in EXAMPLE 33 except that the same positive electrode 10 as EXAMPLE 1 and the same negative electrode 20 as EXAMPLE 33 were used, and that the positive and negative electrodes were placed such that the center exposed portions of the positive and negative electrodes faced each other as shown in FIG. 7.

TABLE 1

|  | Location of heat resistant layer | Area that heat resistant layer faces | Material of heat resistant layer |
|---|---|---|---|
| Ex. 1 | Negative electrode | Center exposed portion | Alumina |
| Ex. 2 | Negative electrode | Center exposed portion + Entire active material layer | Alumina |
| Ex. 3 | Positive electrode | Center exposed portion | Alumina |
| Ex. 4 | Positive electrode | Center exposed portion + Entire active material layer | Alumina |
| Ex. 5 | Separator | Center exposed portion | Alumina |
| Ex. 6 | Separator | Center exposed portion + Entire active material layer | Alumina |
| Ex. 7 | Negative electrode | Center exposed portion + Entire active material layer | Magnesia |
| Ex. 8 |  |  | Zirconia |
| Ex. 9 |  |  | Silica |
| Ex. 10 |  |  | Aramid |
| Ex. 11 |  |  | Polyamide imide |
| Ex. 12 |  |  | Polyimide |
| Ex. 13 | Separator |  | Magnesia |
| Ex. 14 |  |  | Zirconia |
| Ex. 15 |  |  | Silica |
| Ex. 16 |  |  | Aramid |
| Ex. 17 |  |  | Polyamide imide |
| Ex. 18 |  |  | Polyimide |
| Ex. 19 | Negative electrode |  | Alumina |
| Ex. 20 |  |  |  |
| Ex. 21 |  |  |  |
| Ex. 22 |  | Center exposed portion |  |
| Ex. 23 |  |  |  |
| Ex. 24 |  |  |  |
| Ex. 25 |  |  |  |
| Ex. 26 |  |  |  |
| Ex. 27 |  | Center exposed portion + Entire active material layer |  |
| Ex. 28 |  |  |  |
| Ex. 29 |  |  |  |
| Ex. 30 |  |  |  |
| Ex. 31 | Negative electrode | Center exposed portion + Entire active material layer | Alumina |
| Ex. 32 | Negative electrode | Center exposed portion | Alumina |
| Ex. 33 | Negative electrode | Center exposed portion + Entire active material layer | Alumina |
| Ex. 34 | Positive electrode | Center exposed portion | Alumina |
| Ex. 35 | Positive electrode | Center exposed portion + Entire active material layer | Alumina |
| Ex. 36 | Separator | Center exposed portion | Alumina |
| Ex. 37 | Separator | Center exposed portion + Entire active material layer | Alumina |
| Ex. 38 | Negative electrode | Center exposed portion | Alumina |
| Ex. 39 | Negative electrode | Center exposed portion + Entire active material layer | Alumina |
| Comp. Ex. 1 | No | — | — |
| Comp. Ex. 2 | Negative electrode | End exposed portion | Alumina |

TABLE 2

|  | Location of positive electrode lead | Location of negative electrode lead | Thickness [μm] | |
|---|---|---|---|---|
|  |  |  | Second heat resistant layer | First heat resistant layer |
| Ex. 1 | Center portion | Outermost portion | — | 5 |
| Ex. 2 |  |  | 5 |  |
| Ex. 3 |  |  | — |  |
| Ex. 4 |  |  | 5 |  |
| Ex. 5 |  |  | — |  |
| Ex. 6 |  |  |  | 5 |
| Ex. 7 |  |  |  | 5 |
| Ex. 8 |  |  |  | 5 |
| Ex. 9 |  |  |  | 5 |
| Ex. 10 |  |  |  | 5 |

TABLE 2-continued

| | Location of positive electrode lead | Location of negative electrode lead | Second heat resistant layer Thickness [μm] | First heat resistant layer Thickness [μm] |
|---|---|---|---|---|
| Ex. 11 | | | 5 | |
| Ex. 12 | | | 5 | |
| Ex. 13 | | | 5 | |
| Ex. 14 | | | 5 | |
| Ex. 15 | | | 5 | |
| Ex. 16 | | | 5 | |
| Ex. 17 | | | 5 | |
| Ex. 18 | | | 5 | |
| Ex. 19 | | | 5 | 7 |
| Ex. 20 | | | 5 | 10 |
| Ex. 21 | | | 5 | 30 |
| Ex. 22 | | | — | 0.5 |
| Ex. 23 | | | — | 1 |
| Ex. 24 | | | — | 30 |
| Ex. 25 | | | — | 100 |
| Ex. 26 | | | — | 150 |
| Ex. 27 | | | 0.5 | 0.5 |
| Ex. 28 | | | 1 | 1 |
| Ex. 29 | | | 20 | 20 |
| Ex. 30 | | | 25 | 25 |
| Ex. 31 | | | 5 | 5 |
| Ex. 32 | Innermost portion | Center portion | — | 5 |
| Ex. 33 | | | 5 | |
| Ex. 34 | | | — | |
| Ex. 35 | | | 5 | |
| Ex. 36 | | | — | |
| Ex. 37 | | | 5 | |
| Ex. 38 | Center portion | | — | |
| Ex. 39 | | | 5 | |
| Comp. Ex. 1 | | Outermost portion | — | — |
| Comp. Ex. 2 | Innermost portion | | 5 | 5 |

[Evaluation]

(External Short Circuit Test)

Each battery was charged under the conditions given below. In an environment of 20° C., the positive electrode terminal and the negative electrode terminal of the charged battery were short-circuited. Subsequently, the surface temperature of the battery was measured by a thermocouple attached on the side face of the battery. Table 3 shows the surface temperature 30 seconds after the short-circuit.

<Charge Condition>

Constant current charge: current value 1400 mA/end-of-charge voltage 4.3 V Constant voltage charge: voltage value 4.3 V/end-of-charge current 100 mA (Nail Penetration Test)

Each battery was charged under the conditions given below. In an environment of 20° C., the charged battery was pierced from its side to a depth of 2 mm with an iron nail having a diameter of 2.7 mm at a rate of 5 mm/sec, during which the surface temperature of the battery was measured by a thermocouple attached on the side face of the battery apart from the pierced portion. Table 3 shows the temperature 30 seconds after the nail penetration.

<Charge Condition>

Constant current charge: current value 1400 mA/end-of-charge voltage 4.3 V

Constant voltage charge: voltage value 4.3 V/end-of-charge current 100 mA (High Output Characteristics)

In an environment of 20° C., each battery was subjected to the following charge/discharge. Then, the discharge capacity at 0.2 C (It) and that at 3 C (It) were measured.

<Charge/Discharge Condition>

Constant current charge: current value 1400 mA/end-of-charge voltage 4.2 V

Constant voltage charge: voltage value 4.2 V/end-of-charge current 100 mA

Constant current discharge: current value 400 mA (0.2 C)/end-of-discharge voltage 3.0 V Constant current charge: current value 1400 mA/end-of-charge voltage 4.2 V Constant voltage charge: voltage value 4.2 V/end-of-charge current 100 mA Constant current discharge: current value 6000 mA (3 C)/end-of-discharge voltage 3.0 V Table 3 shows a rate of the discharge capacity at 3 C to the discharge capacity at 0.2 C expressed in percentage (%) for each battery.

TABLE 3

| | Battery surface temperature [° C.] | | High output characteristics (%) |
|---|---|---|---|
| | External short circuit test | Nail penetration test | |
| Ex. 1 | 77 | 112 | 82 |
| Ex. 2 | 72 | 86 | 75 |
| Ex. 3 | 70 | 115 | 82 |
| Ex. 4 | 70 | 92 | 71 |
| Ex. 5 | 68 | 108 | 84 |
| Ex. 6 | 72 | 88 | 71 |
| Ex. 7 | 73 | 84 | 69 |
| Ex. 8 | 75 | 90 | 73 |
| Ex. 9 | 69 | 86 | 74 |
| Ex. 10 | 75 | 85 | 79 |
| Ex. 11 | 72 | 93 | 70 |
| Ex. 12 | 74 | 88 | 74 |
| Ex. 13 | 73 | 90 | 75 |
| Ex. 14 | 71 | 91 | 71 |
| Ex. 15 | 74 | 88 | 76 |
| Ex. 16 | 76 | 93 | 74 |
| Ex. 17 | 71 | 94 | 73 |
| Ex. 18 | 69 | 91 | 77 |
| Ex. 19 | 60 | 90 | 77 |
| Ex. 20 | 58 | 87 | 74 |
| Ex. 21 | 61 | 89 | 74 |
| Ex. 22 | 85 | 113 | 84 |
| Ex. 23 | 75 | 105 | 84 |
| Ex. 24 | 63 | 118 | 82 |
| Ex. 25 | 60 | 110 | 80 |
| Ex. 26 | 58 | 106 | 80 |
| Ex. 27 | 83 | 104 | 83 |
| Ex. 28 | 73 | 107 | 77 |
| Ex. 29 | 63 | 75 | 70 |
| Ex. 30 | 62 | 70 | 62 |
| Ex. 31 | 76 | 85 | 77 |
| Ex. 32 | 74 | 109 | 72 |
| Ex. 33 | 73 | 84 | 77 |
| Ex. 34 | 76 | 110 | 73 |
| Ex. 35 | 76 | 89 | 79 |
| Ex. 36 | 72 | 106 | 74 |
| Ex. 37 | 70 | 90 | 77 |
| Ex. 38 | 75 | 111 | 91 |
| Ex. 39 | 76 | 88 | 88 |
| Comp. Ex. 1 | 102 | 118 | 81 |
| Comp. Ex. 2 | 88 | 107 | 54 |

[Analysis]

The batteries of EXAMPLEs 1 to 6 were superior in terms of safety in external short circuit conditions and high output characteristics. This indicates that highly safe batteries capable of offering high output power can be obtained regardless of the location of the first heat resistant layer. The batteries of EXAMPLEs 2, 4 and 6 having both the first and the second heat resistant layers also exhibited excellent safety in the nail penetration test.

Although the compositions of the heat resistant layers were varied in EXAMPLEs 7 to 18, the batteries of EXAMPLEs 7 to 18 were excellent in terms of safety in external short circuit conditions, high output characteristics and safety in nail penetration test. This indicates that the heat resistant layers preferably comprise, but not limited to, inorganic oxide, aramid, polyimide or polyamide imide.

The results of EXAMPLEs 19 to 26 show that it is advantageous that the first heat resistant layer be thicker to enhance safety in external short circuit conditions.

The results of EXAMPLEs 27 to 30 show that when the heat resistant layers are too thin, the effect of enhancing safety becomes small, and when the heat resistant layers are too thick, high output characteristics cannot be obtained.

The results of EXAMPLE 31 show that even when the center exposed portions are formed on both surfaces of the positive electrode current collector, an effect similar to that obtained when the center exposed portion is formed only on one surface of the positive electrode current collector can be obtained.

The results of EXAMPLEs 32 to 37 show that even when the center exposed portion is formed on the negative electrode, an effect similar to that obtained when the center exposed portion is formed on the positive electrode can be obtained.

The results of EXAMPLEs 38 to 39 show that when the positive and negative electrodes each have a center exposed portion, further excellent high output characteristics can be obtained.

The results of COMPARATIVE EXAMPLE 1 show that it is difficult to ensure safety in external short circuit conditions without the first heat resistant layer. In order to ensure safety in external short circuit conditions, at least first heat resistant layer should be formed. The results of COMPARATIVE EXAMPLE 2 show that it is effective to connect at least one of the positive and negative electrode current collecting leads to the substantially center portion of the current collector to ensure high output characteristics.

The present invention is of great value as a highly safe lithium secondary battery capable of offering high output power. The lithium secondary battery of the present invention is highly applicable to power sources for portable devices such as personal digital assistants and mobile electronic devices. The application of the lithium secondary battery of the present invention is not specifically limited, and it is also applicable to compact electrical energy storage system for home use and power sources for two-wheeled vehicles, electric vehicles and hybrid electric vehicles. The shape of the lithium ion secondary battery of the present invention is preferably, but not limited to, a cylinder or prism.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium secondary battery comprising:
    a positive electrode comprising a strip-shaped positive electrode current collector and a positive electrode active material layer carried on each surface of said positive electrode current collector;
    a negative electrode comprising a strip-shaped negative electrode current collector and a negative electrode active material layer carried on each surface of said negative electrode current collector;
    a separator interposed between said positive electrode and said negative electrode; and
    a non-aqueous electrolyte,
    wherein an exposed portion carrying no active material layer is formed on a substantially center portion in a longitudinal direction of at least one of said positive electrode current collector and said negative electrode current collector,
    a current collecting lead is connected to said exposed portion, and
    a first heat resistant layer is formed such that said first heat resistant layer faces at least part of said current collecting lead, and
    wherein a second heat resistant layer is formed such that said second heat resistant layer faces an entire surface of an active material layer that is located across from said current collecting lead, said second heat resistant layer is porous, and said first heat resistant layer is thicker than said second heat resistant layer.

2. The lithium secondary battery in accordance with claim 1, wherein said first heat resistant layer has a thickness of 1 to 100 μm.

3. The lithium secondary battery in accordance with claim 1, wherein said second heat resistant layer has a thickness of 1 to 20 μm.

* * * * *